UNITED STATES PATENT OFFICE.

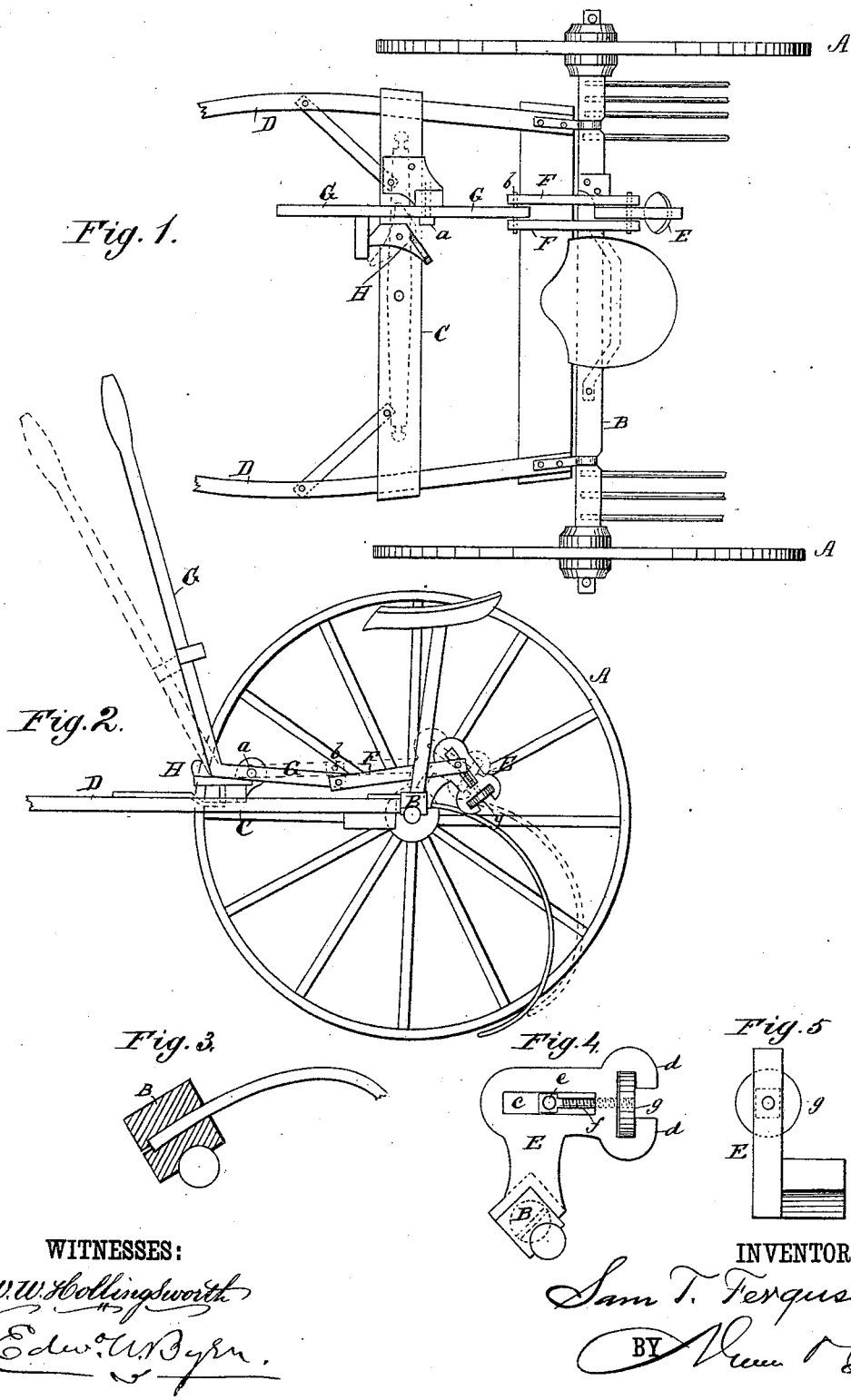

SAM T. FERGUSON, OF MINNEAPOLIS, MINNESOTA.

HORSE-RAKE.

SPECIFICATION forming part of Letters Patent No. 242,620, dated June 7, 1881.

Application filed March 12, 1881. (No model.)

*To all whom it may concern:*

Be it known that I, SAM T. FERGUSON, of Minneapolis, in the county of Hennepin and State of Minnesota, have invented a new and Improved Horse-Rake; and I do hereby declare that the following is a full, clear, and exact description of the same, reference being had to the accompanying drawings, forming part of this specification, in which—
Figure 1 is a plan view. Fig. 2 is a side elevation with the near wheel removed. Fig. 3 is a cross-section of the rake-head, taken through one of the sockets for the rake-teeth. Figs. 4 and 5 are details, showing side and edge views of the arm or extension on the rake-head with which the link connects.

My invention relates to certain improvements in horse-rakes of that form in which curved spring-teeth are attached to the rake-head, and the latter is rocked on its journals to dump the rake by being drawn forward by a link attached to the lower bent end of a hand-lever.

My improvement consists in combining a movable plate or abutment with the link and the hand-lever, which plate may be thrown at will beneath the forward lower end of the hand-lever to throw the joint of the hand-lever and link below its locking-line, to make the rake-head capable of being locked down or be held down without being locked by an adjustment of said plate or abutment while the rake is in the field and in operation without stopping.

The invention also consists in combining the rake-head and the link by a peculiar casting having an adjustable screw for connecting the link to said casting, whereby the vertical adjustment of the rake-teeth may be varied without altering the position of the hand-levers.

In the drawings, A represents the wheels, B the rake-head, C the front cross-bar, and D the shafts, of an ordinary form of horse-rake. This rake-head is provided with a rigid arm or extension, E, which is jointed to the link-bars F, and this link is, in turn, jointed to the rear and lower end of the hand-lever G, which is fulcrumed at *a* upon a casting fixed upon the front cross-bar.

When the joint *b* (between the link and lever) is above a straight line drawn from the fulcrum of the lever to the joint of the link on the rake-head, as in dotted lines, the rake is locked down in a well-known manner. Now, to stop the lever short of this position, or to permit it to move its full stroke, so as to cause the rake to be locked down or not, as desired, I pivot upon the front cross-bar a horizontally-swinging plate or abutment, H, which has a flange or rest for the foot, and which, by the movement of the foot, may be thrown beneath the forward end of the lever, in advance of its fulcrum, (see dotted lines, Fig. 1,) so that the lever cannot have its full stroke, but only moves to the position shown in full lines in Fig. 2, and its joint *b*, with the link, cannot rise to its locking position. This, it will be seen, enables the driver to adjust his rake to the varying resistances to be met with while in the field, and to do this without stopping.

For connecting the link to the rake-head a peculiar casting, E, is employed. This (see Figs. 4 and 5) is fastened to the rake-head, and is constructed with a slot, *c*, and lugs *d d*. In this slot is arranged a square head, *e*, rigidly attached to a screw-stem, *f*, while a hand-nut, *g*, is arranged beneath the lugs *d d* and receives the screw-stem *f*, so that by turning said hand-nut the screw-stem, with head *e*, is adjusted in the slot. To this screw-head *e* is jointed the rear end of the link. With this arrangement it will be seen that by turning the hand-nut *g* in one direction or the other the connection between the hand-lever and rake-head is lengthened or shortened, and the rake-teeth are adjusted higher from or closer to the ground, as desired.

In the simplest mode of attaching the rake-teeth to head—by boring a hole and driving the ends of the wire therein—considerable difficulty has been experienced in removing the teeth when they are required to be taken out. To obviate this objection I bore the rake-head with a bit the size of the wire the rake-teeth are made of until the worm of the bit appears at the opposite side, being careful, however, not to let the bit pass through with its full cut. I then forcibly drive the end of the rake-tooth therein. This arrangement secures the following desirable result: It gives a shouldered bearing to the ends of the rake-teeth, (see Fig. 3,) to prevent them from going clear through, and yet when the tooth is to be dislodged a punch may be inserted in the small hole on the front side to drive the tooth out. I prefer, for economical reasons, to do this in one operation by just allowing the worm of the bit to show through; but I may do it in two operations— i. e., I may bore the hole for the tooth a given distance, and then continue it by a smaller bit or gimlet. This latter method enables me to locate the end of the rake-tooth nearer the middle of the rake-head, and this secures a greater amount of wood in front of it to give a more solid shoulder. I find the first arrangement, however, satisfactory and more economical.

In defining my invention more clearly I would state that I am aware that the position of the locking-joint $b$ in a horse-rake has been heretofore determined by an adjustable stop; and I do not claim this, broadly, but only a horizontally-swinging abutment-plate which co-operates with the lever G in front of its fulcrum by direct abutment.

I am also aware that a screw-connection has been interposed between the rake-head and the lifting-link of the hand-lever, and I only claim in this connection my peculiar structure of devices.

Having thus described my invention, what I claim as new is—

1. The combination, with the tilting rake-head, the link F, and the elbow-lever G, jointed to the link F at $b$ and fulcrumed at $a$ at a point back of its bend, of the horizontally-swinging abutment-plate H, arranged, as described, to be thrown beneath the lever in front of its fulcrum, to limit the movement of the locking-joint $b$, as described.

2. The combination, with the link F and the rake-head, of the peculiarly-constructed casting E, fixed to the rake-head, and formed with slot $c$ and lugs $d$ $d$, the screw-nut $g$, swiveling behind the lugs $d$ $d$, and the threaded stem $f$, extended through the screw-nut, and having an eye, $e$, jointed to the link, substantially as described.

SAM T. FERGUSON.

Witnesses:
EDWD. W. BYRN,
CHAS. A. PETTIT.